United States Patent
Zheng et al.

(10) Patent No.: US 11,400,555 B2
(45) Date of Patent: Aug. 2, 2022

(54) OUTER ROTOR MOTOR DIRECT-DRIVE DRILLING OR MILLING MACHINE

(71) Applicants: ZhiYing Zheng, Shanghai (CN); Xiaofei Zheng, Huaian (CN)

(72) Inventors: ZhiYing Zheng, Shanghai (CN); Charlie Zhi-Lin Zheng, San Antonio, TX (US); Xiaofei Zheng, Huaian (CN)

(*) Notice: Subject to any disclaimer, the term of this patent is extended or adjusted under 35 U.S.C. 154(b) by 96 days.

(21) Appl. No.: 16/641,257

(22) PCT Filed: Dec. 11, 2018

(86) PCT No.: PCT/CN2018/120253
§ 371 (c)(1),
(2) Date: Feb. 24, 2020

(87) PCT Pub. No.: WO2020/103219
PCT Pub. Date: May 28, 2020

(65) Prior Publication Data
US 2021/0146490 A1 May 20, 2021

(30) Foreign Application Priority Data
Nov. 22, 2018 (CN) .......................... 201811395860.4

(51) Int. Cl.
| B23Q 5/10 | (2006.01) |
| B23B 39/10 | (2006.01) |
| B23B 47/26 | (2006.01) |
| B23C 1/06 | (2006.01) |
| B23Q 5/32 | (2006.01) |

(52) U.S. Cl.
CPC ................ *B23Q 5/10* (2013.01); *B23B 39/10* (2013.01); *B23B 47/26* (2013.01); *B23B 2260/062* (2013.01); *B23C 1/06* (2013.01); *B23Q 5/326* (2013.01); *B23Q 2210/004* (2013.01)

(58) Field of Classification Search
CPC ...... B23Q 5/10; B23Q 11/127; B23Q 11/126; B23Q 2230/002; B23B 39/10
See application file for complete search history.

(56) References Cited

U.S. PATENT DOCUMENTS 3,837,757 A * 9/1974 Levine ..................... B23Q 5/10
408/14
4,422,498 A * 12/1983 Chen .................... B23Q 11/127
165/47

FOREIGN PATENT DOCUMENTS

CN 207915079 U * 9/2018

OTHER PUBLICATIONS

English translation of CN 207915079 (Year: 2018).*

* cited by examiner

*Primary Examiner* — Alan Snyder

(57) ABSTRACT

An outer rotor motor direct-drive drilling or milling machine, including a machine base, a frame, a mechanical driving component and an electrical control box, component. The frame is installed on the machine base, a mechanical transmission box component is installed on the frame, the electrical control box component is located on the top of the frame. A mechanical driving component includes an mechanical execution component and a lifting mechanism, the mechanical execution component is composed of a hollow shaft outer rotor motor and an output shaft assembly. The output shaft of the output shaft assembly and the hollow shaft of the outer rotor motor are fitted in the form of a key or a spline. This form of cooperation chooses the fit forms that can transmit the speed and torque of the motor and can move the output shaft axially.

8 Claims, 6 Drawing Sheets

OUTER ROTOR MOTOR DIRECT-DRIVE DRILLING OR MILLING MACHINE

TECHNICAL FILED

The present disclosure relates to the field of drilling machines (milling machines), and more particularly to a new type of drilling machine or milling machine that changes the driving mode and connection mode of the drilling machine.

BACKGROUND

There are generally three types of transmission working methods of conventional drilling (milling) machines: the first is that the induction motor drives the drilling (milling) head by a V-belt drive to achieve drilling (milling) operation, and its speed change is often achieved by manual groove change of two reverse-mounted cone pulley mechanisms, but the speed adjustment operation is complicated and there are certain safety risks; the second is that through two variable diameter belt wheels, by changing diameters of the diving and driven wheels to reach steplessly adjustment, but its mechanism is complex, heavy, and cost high, and the degree of tightness of the belt is determined by operating experience; the third is that the stepless speed regulation and the drilling (milling) function is achieved by the belt transmission by using of brushless motors to control characteristics, its mechanism is complex, the manufacturing is difficult and the cost is high.

The common disadvantages of the above three mechanisms are: the mechanism of the belt transmission mode reduces the transmission efficiency and the motor power is not fully utilized; the wear of the transmission belt needs to be replaced frequently, which increases the running and time costs and has a certain potential safety hazard; the mechanisms are complex, bulky, heavy, complicated to manufacture, and the cost of the process is high; the use of natural resources and human resources is large, the logistics cost is large, and the comprehensive cost is high.

SUMMARY

The present disclosure utilizes the characteristics of high efficiency, large torque, constant power compensation for speed regulation, precise speed measurement and stepless speed regulation of the outer rotor permanent magnet brushless motor, and utilizes the characteristics of axial movement of the output shaft of the motor to directly convert the motor work into the power consumption during drilling or milling. The reactive power loss is extremely low, and the machine volume is greatly reduced, so that the resource loss and transportation cost is reduced.

For the purpose of the above present disclosure, the present disclosure is realized as follows: An outer rotor motor direct-drive drilling or milling machine, comprising a machine base, a frame, a mechanical driving component and an electrical control box component; the frame is installed on the machine base, a mechanical transmission box component is installed on the frame, the electrical control box component is located on a top of the frame; the mechanical driving component comprises an mechanical execution component and a lifting mechanism, wherein the mechanical execution component is composed of a hollow shaft outer rotor motor and an output shaft assembly; an output shaft of the output shaft assembly and a hollow shaft of the outer rotor motor are fitted in a form of a key or a spline, wherein the fit form chooses a fit form that transmits a speed and a torque of the motor and drives the output shaft to move axially; an other end of the output shaft assembly is equipped with a drill chuck, and a guide rail rack pushing rod of the lifting mechanism is connected to a pressing sleeve in a middle of the output shaft to drive the output shaft assembly to move axially up and down.

The concept of the present disclosure is to form a sliding fit by a key or spline with the output shaft by the hollow shaft of the outer rotor, so as to realize the function of directly driving the output shaft to rotate. When transferring the work of the motor, because the hollow shaft of the outer rotor under the action of the key, the output shaft and the outer rotor moves in the same circumferential direction, can be regarded as relatively static. Therefore, there is almost no power loss between the two. A small amount of power is consumed by friction at the side of the key only when the output shaft moves axially. The guide rail rack pushing rod in the lifting mechanism is used to apply axial force to the pressing sleeve to drive the output shaft to realize reciprocating motion in the hollow shaft of the motor rotor. For other control parts, they remain unchanged, such as the installation of the drill bit and the control part. For the purpose of this disclosure, the use of the motor can refer to the Chinese patent, No.: CN201820577986.2, patent name: Outer rotor motor.

As an further improvement of the technical solution described above, the hollow shaft of the hollow shaft outer rotor motor is connected to the output shaft of the driving output assembly by a key or a spline, and the output shaft of the driving output assembly is connected to the stator bracket of the hollow shaft outer rotor motor by a bearing.

This solution is designed to ensure that the output shaft can be normally driven by the outer rotor motor, which reflects how the output shaft is combined with the motor. The size of the inner hole of the hollow shaft is tightly matched (or integrated) with the rotor bracket, the diameter of the matched output shaft and the matched key can be selected according to the size of the motor. The realization of such technology can be realized for those in the art through the introduction of the above words.

As an further improvement of the technical solution described above, the hollow shaft outer rotor motor uses an axial-flow blade or a centrifugal blade, and the axial-flow blade or the centrifugal blade is separated or integrally formed with a housing of the hollow shaft outer rotor motor. For the design of the blade, please refer to patent 201820577986.2. To the separated type, the traditional way to add the blade can be adopted. This separated design can be inferred by those in the art.

As an further improvement of the technical solution described above, a spiral steel belt protective sleeve is used between the output shaft assembly and the outer rotor motor. The spiral steel belt protective sleeve has the functions of expanding and contracting and dust-proof, and has a certain damping function during cutting. The spiral steel belt protective sleeve is formed by a certain width and thickness of steel belt tightly wound with a certain height in the spiral shape.

As an further improvement of the technical solution described above, the lifting mechanism comprises a pressing sleeve and a driving gear, the pressing sleeve is connected to the output shaft by a deep groove ball bearing and a thrust ball bearing, the pressing sleeve is fixedly connected to outer rings of the deep groove ball bearing and the thrust bearing, a lower portion of the pressing sleeve is locked with a locking bolt, and the driving gear acts on the pressing sleeve by a guide rail rack pushing rod.

The key problem of this solution is to solve the problem that how to realize the movement of up and down or left and right on the premise that the output shaft rotates. In this solution, the inner ring of the deep groove ball bearing is tightly matched with the output shaft, and the outer ring is fixedly connected to the pressing sleeve, so that the pressing sleeve does not rotate on the premise of shaft rotation, and the lifting mechanism can still drive the pressing sleeve to move up and down, so as to realize the up and down movement of the output shaft. In order to make the operation more stable and prevent the radial force pushing, the thrust ball bearing is used in parallel with the deep groove ball bearing. The lifting mechanism applies force on the pressing sleeve, and the thrust ball bearing and deep groove ball bearing are used inside the pressing sleeve to eliminate the axial force and radial force during cutting. The lifting mechanism is configured to move the output shaft assembly up or down as a whole.

As an further improvement of the technical solution described above, the driving gear is provided on a shaft of a rotating handle, the driving gear of the rotating handle acts on a rack part of the guide rail rack pushing rod to convert the rotation motion into linear motion, the guide rail rack pushing rod is connected to the pressing sleeve to drive the output shaft assembly to move up and down. A positioning and locking bolt passes through the guide rail bracket horizontally and constructs a thread pair with the guide rail bracket. The positioning and locking bolt is rotated, so as to fasten or loose a guide rail side surface of the guide rail rack pushing rod, thereby the guide rail rack pushing rod is locked or loosen. It is used for the positioning of the milling cutter when pressing and locking. When the milling cutter is adjusted to the required depth, the plane or groove can be milled on the locked work surface. It is used for drilling when loosening, and the guide rail rack pushing rod can drive the output shaft assembly to move up and down.

Another solution is that under the condition that the above transmission mechanism and locking mechanism remain unchanged, a displacement sensor can be placed between the guide rail bracket and the guide rail rack pushing rod. As the guide rail rack pushing rod moves, the displacement signal can be provided. After processing, it can be converted into a digital signal and displayed on the display screen.

The principle of the lifting mechanism is to rotate the handle on the handle assembly to overcome the preset torsion of the torsion spring. The gear fixed on the shaft drives the guide rail rack pushing rod to move downward. The guide rail rack pushing rod drives the output shaft assembly to move up and down by fixing the guide rail rack pushing rod on the pressing sleeve (realized by screws). The guide rail bracket and the guide rail rack pushing rod form a sliding pair. Another positioning and locking mechanism constructs a thread pair by a screw and a thread hole on the guide rail bracket. Rotating the sliding button can fix or loosen the guide rail rack pushing rod, thereby the relative position of the output shaft assembly is fixed. It is used to locate the milling cutter during milling when the mechanism is locked, and it can be used during drilling when the mechanism is released.

As an further improvement of the technical solution described above, the mechanical transmission box and the electrical control box are two relatively independent parts, a box portion of the electrical control box is made of insulating materials, and all live components are assembled in the insulating box portion; two groups of wires enter the mechanical control box, which are motor drive and signal acquisition line groups and displacement sensor power and signal line group.

The technical solution adopts the independent design of mechanical transmission box and electrical control box, which makes the design of mechanical and electronic separation realize the independent design of two parts, and is convenient for future maintenance.

As an further improvement of the technical solution described above, the mechanical driving component and the electrical control box are both arranged on the top of the frame of the drilling machine or milling machine, the motor and the electrical control box are wrapped by a shell, an air outlet is arranged at the blade facing the top of the motor, and an air inlet is arranged at the end of the electrical control box.

In this solution, under the action of the blades of the motor, the cold air is drawn in from the back of the electrical control box. First, the electronic components (PCB control board), switches, capacitors, etc. are cooled. Then, the air outlet of the electrical control box leads the cold air into the mechanical transmission box (refer to FIG. 6) and into the interior of the motor, which is discharged from the machine under the action of the blades.

The present disclosure utilizes the characteristics of the outer rotor permanent magnet brushless motor with high efficiency, large torque, constant speed power compensation, accurate speed measurement and stepless speed regulation, and uses the feature that the output shaft of the motor can move axially to convert the motor work directly into power consumption during drilling (milling), which has extremely low reactive power loss, so greatly reducing the machine volume, reducing resource loss, and achieving visual accurate stepless speed regulation and chip (milling) depth detection. Drilling and milling operations can complete axial movement and axial positioning. The machine has large power, small size, light weight, low manufacturing cost, high production efficiency, and simple maintenance.

BRIEF DESCRIPTION OF THE DRAWINGS

FIG. 8a is a connection relationship diagram of the pressing sleeve and a lifting mechanism.

FIG. 8b is a cross-sectional view taken along the line A-A of FIG. 8a.

Figure 1:
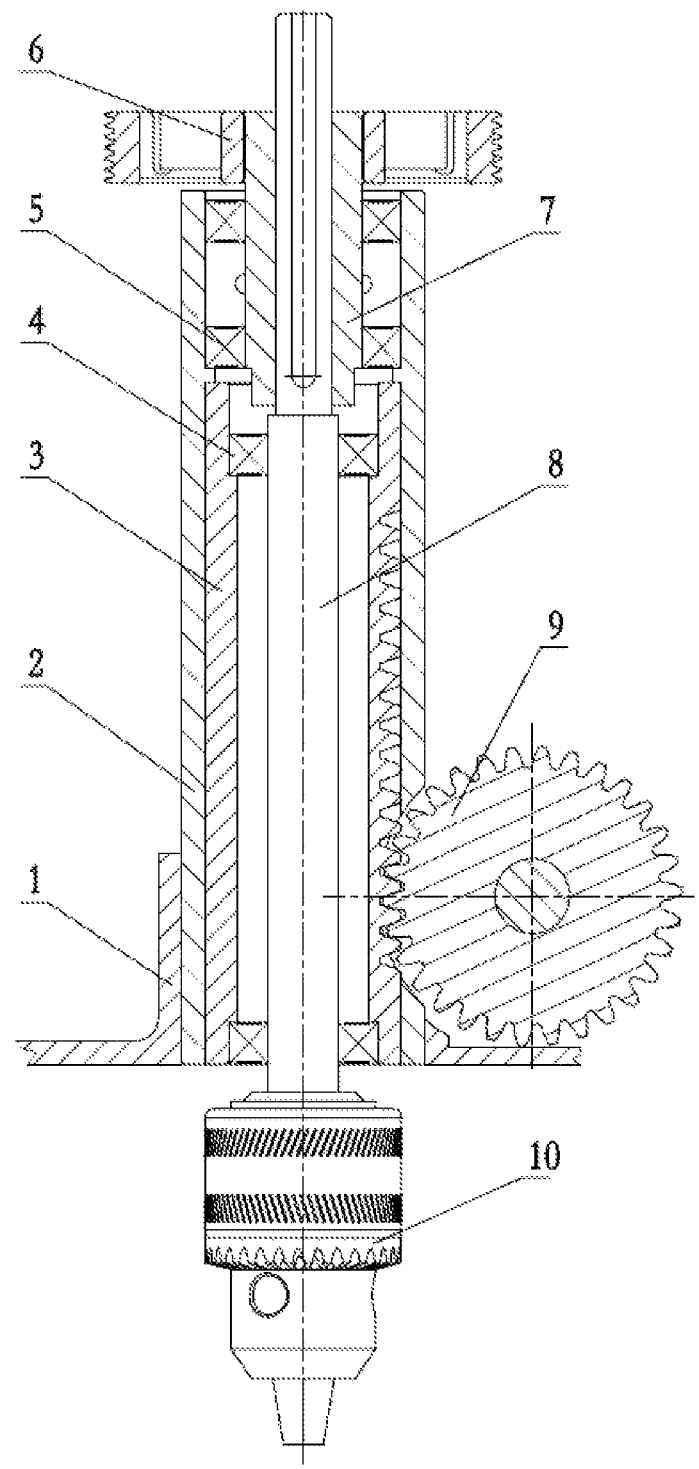
FIG. 1 is a schematic diagram showing a output shaft structure in prior art.
Figure 2:
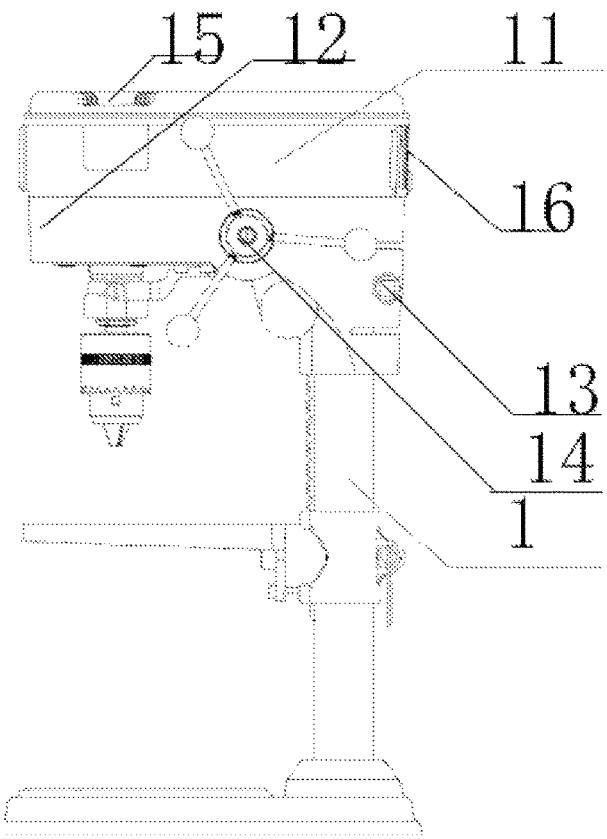
FIG. 2 is a schematic diagram showing the overall appearance of the present disclosure.
Figure 3:
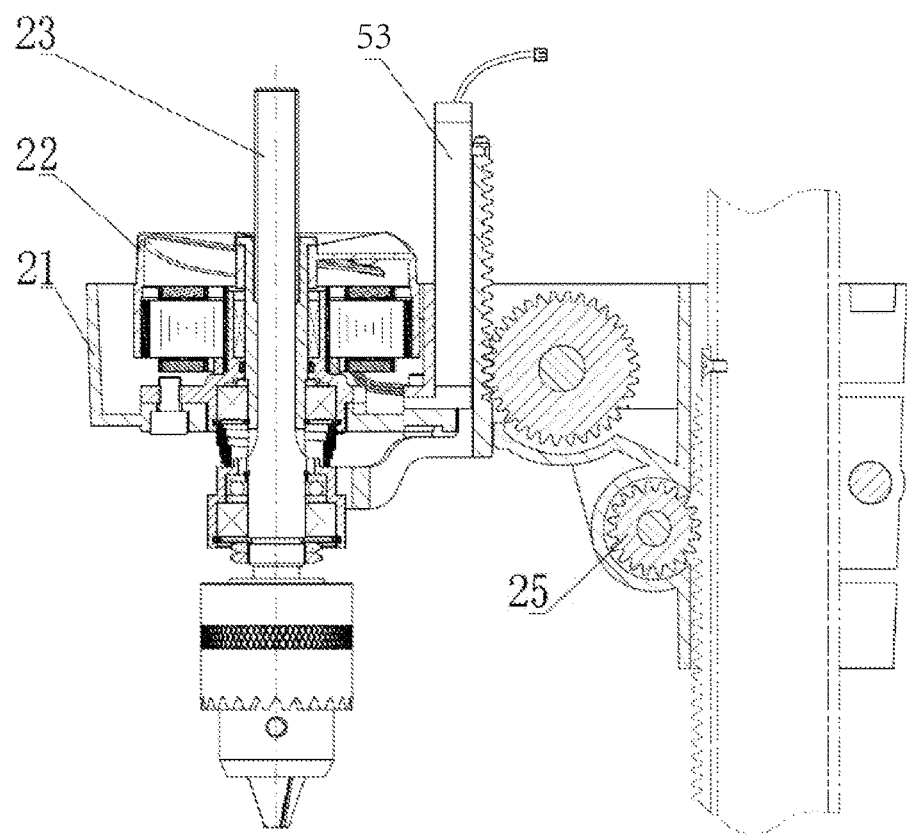
FIG. 3 is a cross-sectional view of a portion of an internal mechanical structure.

1. frame; 2. sleeve; 3. rack guide; 4. bearing ax2; 5. bearing bx2; 6. belt pulley; 7. swivel sleeve; 8. output shaft; 9. advancing gear assembly; 10. drill chuck; 11. electrical control box component; 12. mechanical execution component; 13. positioning and locking mechanism; 14. rotating handle; 15. air outlet; 16 air inlet; 21. box assembly; 22. hollow shaft outer rotor motor; 23. output shaft; 24. locking and advancing (retracting) knife mechanism assembly; 25. power box lifting mechanism assembly (small drilling and milling machine can be omitted); 30. integrated blade; 31. stator bracket; 32. rotor bracket; 33. magnetic steel; 34. hollow shaft; 35. stator assembly; 36. bearing 1; 37. seal ring; 38. gasket; 39. bearing 2; 310 retaining ring; 31a hollow shaft sleeve; 31b rotor bracket; 42. locking nut; 43. retaining ring for hole; 44. deep groove ball bearing; 45. thrust ball bearing; 46. pressing sleeve; 47. retaining ring for shaft; 48. spiral steel belt protective sleeve; 51. guide rail bracket; 52. guide rail fixing screw; 53. displacement sensor; 54 pressing plate and screw; 55. guide rail rack pushing rod; 56. driving gear; 57 locking mechanism; 58. pre-tensioned torsion spring; 59. shaft 50. handle assembly; 511. shoulder screw; 61. screw; 62. retaining ring for shaft; 63. sliding button; 64. spring pin.

DETAILED DESCRIPTION OF THE EMBODIMENTS

In order to further illustrate the features of the present disclosure, the following is further described with reference to the accompanying drawings. As shown in the figures, an outer rotor motor direct-drive drilling machine or milling machine includes a machine base, a frame 1, and a mechanical driving component 12 and electrical control box component 11. The frame is installed on the machine base, a mechanical transmission box component is installed on the frame, the electrical control box component is located on the top of the frame, the mechanical power component includes a execution component and a lifting mechanism. The frame is composed of a traditional base assembly, a workbench assembly, a lifting rack (small drilling and milling machines can omitted the lifting rack), a riser and so on, this part can refer to the standard design.

Design and disclosure principle of mechanical transmission box component: The mechanical transmission box component is mainly composed of the following parts:
1. Box assembly: the box assembly is composed of box and locking mechanism (locked with the riser of frame). The position of the box on the frame is determined by using the elastic deformation of the junction of the box and the riser of frame and locking with bolts. The box can be made of metal or non-metal materials according to the motor size and mechanical strength requirements.

Figure 4:
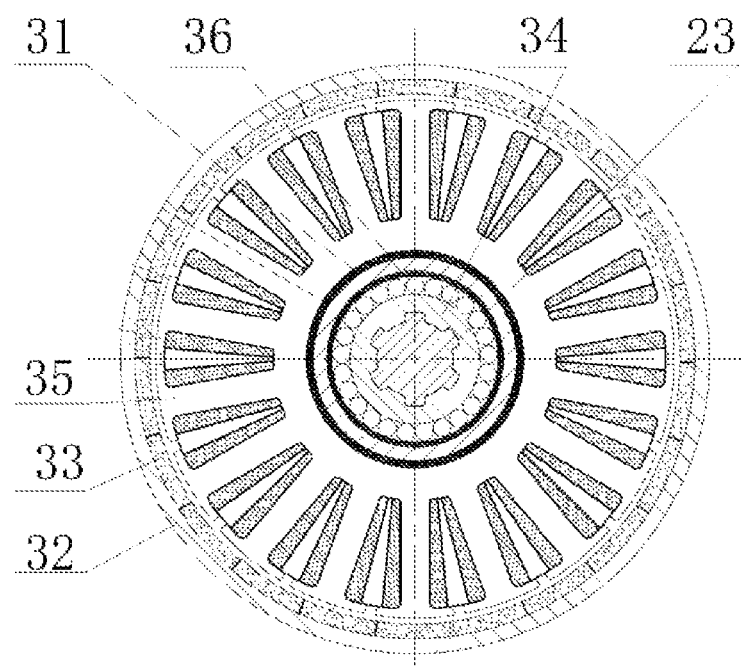
FIG. 4 is a connection diagram of a motor and an output shaft.
Figure 5:
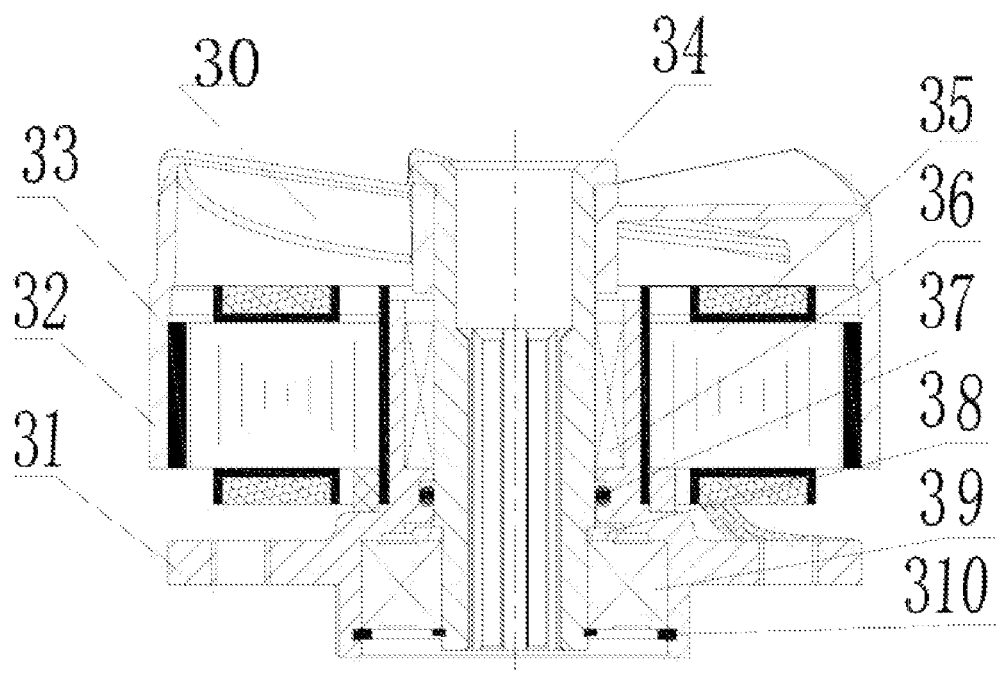
FIG. 5 is a longitudinal sectional connection diagram of the motor and the output shaft.

2. FIG. 4 and FIG. 5 are longitudinal sectional and cross sectional views of the hollow shaft outer rotor motor, showing the relationship with the output shaft. Most of the components are components of the traditional outer rotor motor, which will not be introduced here. It is specially pointed out that the hollow shaft outer rotor motor is the patent of our company (patent name: outer rotor motor; patent No.: 201820577986.2, inventor: Zheng ZhiYing, Zheng Xiaofei): the rotor shaft of the outer rotor motor is made into a hollow shaft (also known as the guide sleeve). The speed and torque of the motor are transmitted to the output shaft 23 by the key (flat key, semicircle key, ball key) or spline (rectangular spline, involute spline), and the output shaft assembly performs the processing task. According to the requirements of accuracy and strength, the inner hole of the hollow shaft can be made into various forms to meet the transmission torque and speed and to allow the axial movement of the output shaft 23.

The diameter of the hollow shaft must meet two requirements at the same time: first, the design of the middle hole of the stator core must meet the requirements of the magnetic field density of the motor; second, the output shaft must meet the requirements of the strength.

The middle hollow shaft of the hollow shaft outer rotor motor is connected to the output shaft of the driving output assembly by a key or spline, and the output shaft of the driving output assembly and the stator bracket of the hollow shaft outer rotor motor are connected by a bearing.

Hollow shaft motor blades 31A can be made into two modes as centrifugal blade and axial-flow blade. The axial-flow blade is shown in the figure. This kind of axial-flow blade is integrally formed with a rotor bracket 31B. If the rotor bracket is metal stamping, the blades can be directly stamped, and the large motor can be cast. The purpose of this design is to reduce volume, weight and process cost. The number of blades depends on the size of the motor, but at least not less than 2. The rotor bracket is formed by stamping or casting.

The hollow shaft motor is fixed on the box by screws, and its power line is connected with the driving power output from the electrical control box by a connector to obtain the driving power and to output the motor rotation signal.

3. Output shaft assembly: the output shaft assembly obtains the speed and torque (power) applied by the motor rotor and the axial force applied by the guide rail rack pushing rod 55 in the locking and advancing (retracting) mechanism to the pressing sleeve 46 by the shoulder screw, so that the output shaft assembly 23 obtains the rotary motion and the reciprocating linear motion. The thrust ball bearing 44 and the deep groove ball bearing 45 are combined by a retaining ring for shaft 47 and are positioned by a retaining ring for hole 43, and the nut 42 is used for locking, the axial force and the radial force in the process of drilling (or milling) are eliminated respectively.

It is specially pointed out that this design uses the spiral steel belt protective sleeve 48. the spiral steel belt protective sleeve 48 has the function of waterproof and dustproof, and has certain axial force of expanding and contracting, which can reduce cutting vibration and improve the processing quality.

Figure 8:
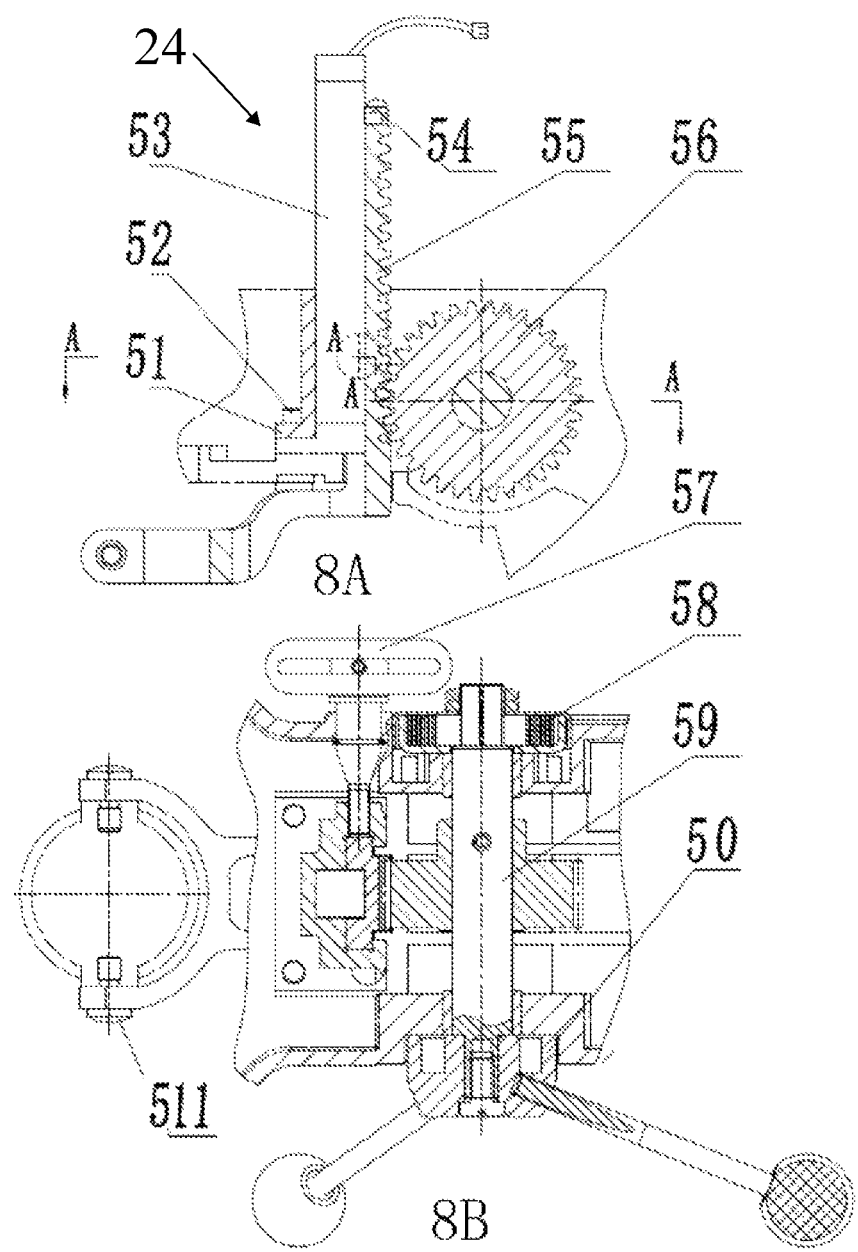

4. As shown in FIG. 8a, a locking and advancing (retracting) knife mechanism assembly is composed of a sliding pair consisting of a guide rail bracket 51 and a guide rail rack pushing rod 55 and a gear pair consisting of a guide rail rack pushing rod 55 and a gear 56, and a guide rail bracket 51 is fixed on the box by a screw 52. According to the accuracy requirements, different types of sliding pairs can be selected, and the rectangular guide rail is selected as shown in the figure. The guide rail rack pushing rod 55 is connected to the pressing sleeve 46 in the output shaft assembly by the screw 54, and the pressing sleeve is connected to the deep groove ball bearing by the shoulder screw 511. When the guide rack pushing rod 55 is assembled at the top dead center, the torsion spring 58 connected to the shaft 59 is pre-tightened, and the position of the torsion spring is locked by tightening the nut 57, so that the output shaft assembly driven by the guide rack pushing rod is always at the top dead center position, and the gear and handle assembly 50 are fixed on the shaft 59. When the handle 50 is rotated, the guide rack pushing rod can be driven to move downward, so that the output shaft assembly can obtain the downward movement and complete the cutting when the output shaft assembly is rotated.

See FIG. 8b, in order to obtain clear and accurate drilling depth and tool setting depth for the user, a displacement sensor 53 is placed between the guide rail bracket and the guide rail rack pushing rod, and a moving block on the displacement sensor 53 is fixed on the guide rail rack pushing rod 55 by a pressing plate and a screw. The displacement signal can be output when the guide rail rack pushing rod is moved, and the user can read out the relative displacement and absolute displacement values from the display screen. Of course, the selection may not be necessary to install a displacement sensor 53.

Figure 9:
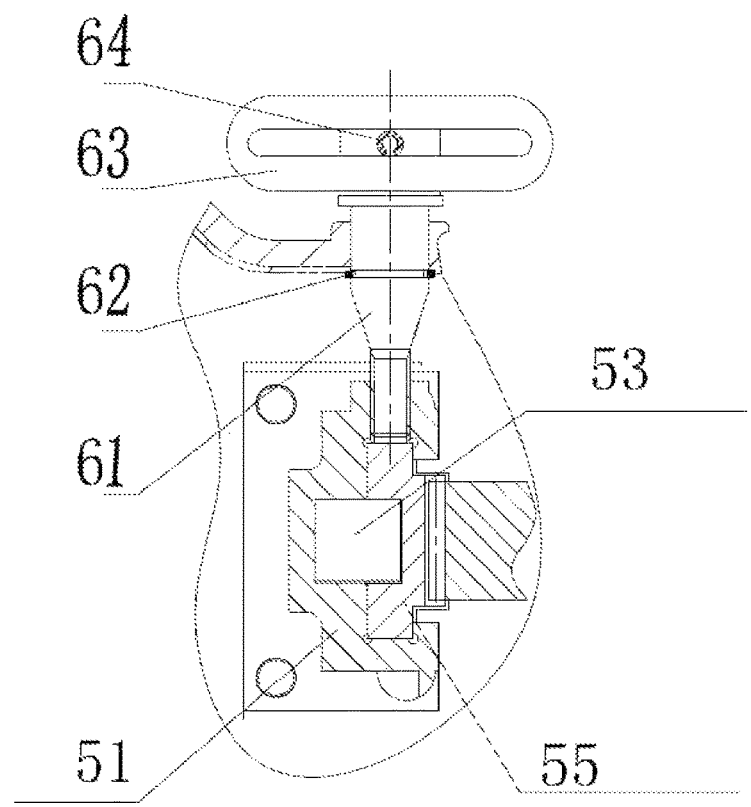
FIG. 9 is a connection diagram of a positioning and locking mechanism.

See FIG. 9, in consideration of the need to fix the position of the milling cutter when the user has milling requirements, the locking mechanism is designed. The principle is to add a locking mechanism on the joint surface of the guide rail bracket 51 and the guide rail rack pushing rod 55. One end of the screw 61 is slotted to put into the sliding button 63, which is fixed by the spring pin 64 and supported by the box. First, the thread part is pre-screwed into the guide rail bracket 51 during assembly, do not tighten the guide rail rack pushing rod, and the spring retainer 62 is installed to limit the position. When the machine tool is used for drilling, the screw 61 is in a loose state, and the guide rail rack pushing rod can move up and down to complete the drilling work. When the machine tool is used for milling, the tool setting position is adjusted, that is, tightening the screw, locking the guide rail rack pushing rod, so that the pushing rod is in a static state which can use to mill a plane or a groove.

The lifting mechanism assembly of the power box (small drilling and milling machine may not used it), etc.

Electrical control box component (this part relates to the prior art, and can be designed according to the actual situation): the box is made of non-metallic insulating materials, and the display operation panel assembly, control system assembly (PCB), driving power supply, switches, etc. are assembled in it, so that the live parts or components are strictly separated from the mechanical transmission box component, and the motor driving power line is connected to the motor in the mechanical transmission box. The displacement sensor 53 is a low-voltage component, and the low-voltage power supply is provided in the electrical control box, and the position signal is collected. The electrical components here are all available to those in the art.

The design and layout idea of separating the electrical control box and the mechanical transmission box are as follows: 1. The motor driving system and the control system and the mechanical transmission system belong to two different manufacturing units. In the coordination process, only one socket can drive the motor and collect the motor motion signal. In addition, the displacement sensor 53 belongs to the low-voltage component, and only one socket can realize the displacement signal transmission; 2 All other high and low voltage components are integrated and assembled in the box made of insulating materials, which improves the safety performance; 3. It is easy to realize automatic production.

Figure 6:
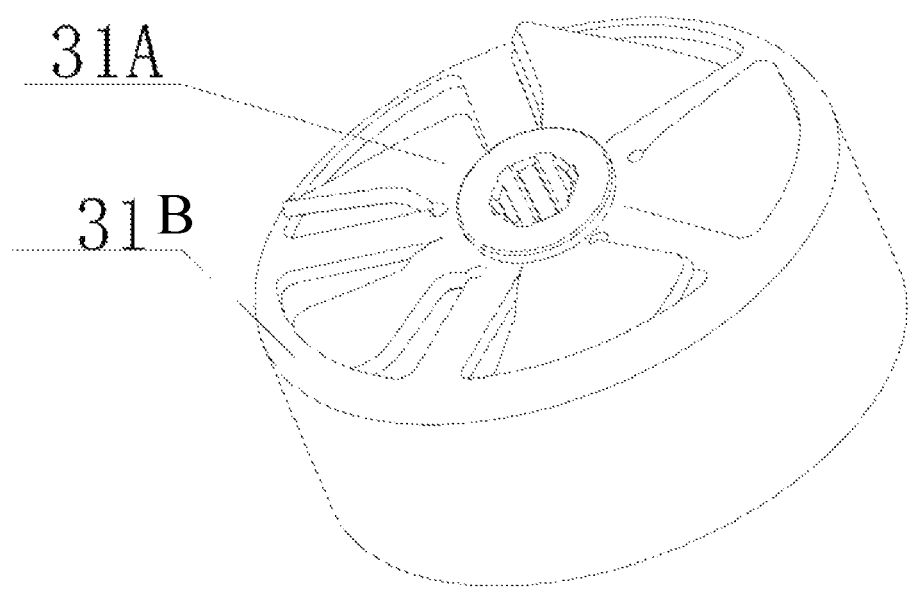
FIG. 6 is a schematic diagram of a rotor bracket.
Figure 7:
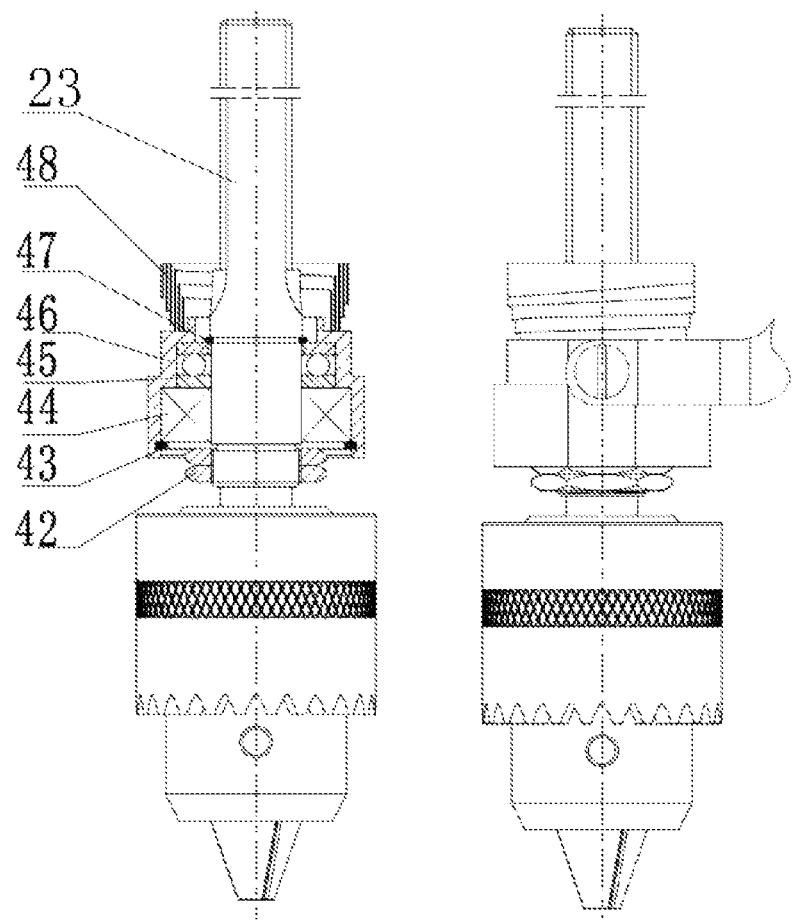
FIG. 7 is a connection relationship diagram of the output shaft, a pressing sleeve, and a drill.
Figure 10:
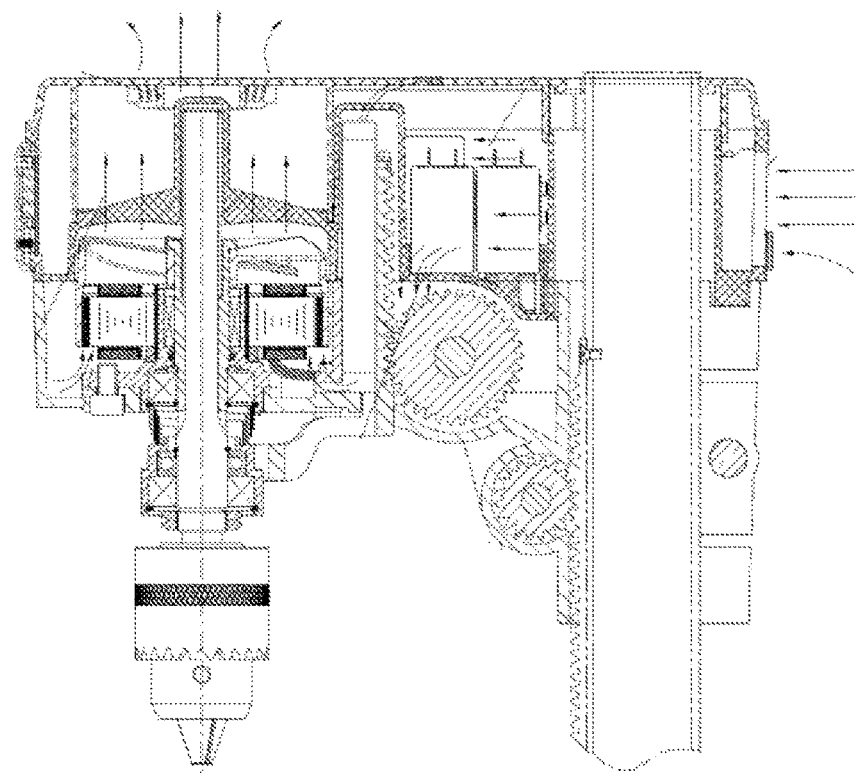
FIG. 10 is a diagram showing the equipment air circulation.

2. The cooling system principle of the present disclosure is shown in FIG. 10: Under the action of the blade of the motor, the cold air enters an air inlet 16 from the rear of the electrical control box. First, the electronic components (PCB), switches, capacitors, etc. will be cooled down, then the air outlet 15 of the electrical control box will lead the cold air into the mechanical transmission box (refer to FIG. 6) and enter into the interior of the motor, and then discharge put of the machine under the action of the blade.

As described above, the outer rotor motor is designed as a hollow shaft (guide sleeve) and has an axial guidance function, and another output shaft 23 is arranged to receive the rotation and torque of the motor, and can move axially in the hollow shaft. The output shaft 23 has a mechanism to undertake the axial force of the guide rail rack pushing rod 55 to realize the up and down axial movement, so that the drill bit (or milling cutter) clamped by the drill chuck installed on the output shaft can complete the drilling and milling work.

The present disclosure highly integrates of a rack lifting mechanism 25, a displacement sensor 53 (if necessary), a lifting and locking mechanism, a driving gear mechanism and a driving gear reset mechanism together, which has advantages in small use space, simple manufacturing. And the output shaft is not affected by radial force when working, so that the machining accuracy and service life of the drilling (milling) machine is enhanced. It greatly reduces the volume and weight of the machine tool.

Compared with the traditional drilling or milling machine, the direct-drive drilling or milling machine of the outer rotor motor completely changes the transmission mode, so that the motor power is used to the maximum extent, the reactive power loss is reduced, so as to realize energy saving and environmental protection.

The present disclosure applies the principle that the brushless motor can be digital control to achieve accurate stepless speed regulation and energy compensation of the motor. The visualization of the speed and advancement value greatly reduces the operation intensity and enables the operator to work easily and pleasantly.

What is claimed is:

1. An outer rotor motor direct-drive drilling or milling machine, comprising a machine base, a frame, a mechanical driving component and an electrical control box component; the frame is installed on the machine base, a mechanical transmission box component is installed on the frame, the electrical control box component is located on a top of the frame; the mechanical driving component comprises an mechanical execution component and a lifting mechanism, wherein the mechanical execution component is composed of a hollow shaft outer rotor motor and an output shaft assembly; an output shaft of the output shaft assembly and a hollow shaft of the outer rotor motor are fitted in a form of a key or a spline, wherein the fit form chooses a fit form that transmits a speed and a torque of the motor and drives the output shaft to move axially; an other end of the output shaft assembly is equipped with a drill chuck;

the lifting mechanism comprises a pressing sleeve, a guide rail rack pushing rod and a driving gear; the guide rail rack pushing rod comprises a guide rail part, a rack part and a pushing rod part; the rack part and the driving gear form a gear pair; the guide rail part and a guide rail bracket form a sliding pair; the pushing rod part is connected to the pressing sleeve in a middle of the output shaft to drive the output shaft assembly to move axially up and down;

the mechanical driving component and the electrical control box are both arranged on the top of the frame of the drilling machine or milling machine, the motor and the electrical control box are wrapped by a shell, an air outlet is arranged at an axial-flow blade facing the top of the motor, and an air inlet is arranged at an end of the electrical control box;

the outer rotor motor, the electrical control box and the mechanical transmission box are internally communicated to form an air flow channel, cold air enters from the air inlet by rotating of the blade of the outer rotor motor; the cold air passes through the air flow channel, and then is discharged from the air outlet to form a cooling system, and the outer rotor motor, the electrical control box and the mechanical transmission box are internally cooled at the same time;

the guide rail part and the guide rail bracket form an encircled space; a displacement sensor is provided in the encircled space;

the axial-flow blade is integrally formed with a housing of the hollow shaft outer rotor motor.

2. The outer rotor motor direct-drive drilling or milling machine according to claim 1, wherein the hollow shaft of the hollow shaft outer rotor motor is connected to the output shaft of a driving output assembly by a key or a spline, and the output shaft of the driving output assembly is connected to a stator bracket of the hollow shaft outer rotor motor by a bearing.

3. The outer rotor motor direct-drive drilling or milling machine according to claim 1, wherein a spiral steel belt protective sleeve is used between the output shaft assembly and the outer rotor motor; the spiral steel belt protective sleeve is formed by a steel belt; the spiral steel belt protective sleeve has the functions of waterproofing and dustproofing, and is able to reduce cutting vibration.

4. The outer rotor motor direct-drive drilling or milling machine according to claim 1, wherein the pressing sleeve is connected to the output shaft by a deep groove ball bearing and a thrust ball bearing, the pressing sleeve is fixedly connected to outer rings of the deep groove ball bearing and the thrust bearing, a lower portion of the pressing sleeve is locked with a locking bolt, and the driving gear acts on the pressing sleeve by a guide rail rack pushing rod.

5. The outer rotor motor direct-drive drilling or milling machine according to claim 4, wherein the driving gear is arranged on a shaft of a rotating handle.

6. The outer rotor motor direct-drive drilling or milling machine according to claim 4, wherein a positioning and locking bolt passes through the guide rail bracket horizontally and constructs a thread pair with the guide rail bracket; the positioning and locking bolt is rotated to fasten or loose a guide rail side surface of the guide rail rack pushing rod till the guide rail rack pushing rod is locked or loosen.

7. The outer rotor motor direct-drive drilling or milling machine according to claim 4, wherein the positioning and locking bolt passes through the guide rail bracket horizontally and is pushed on the guide rail rack pushing rod.

8. The outer rotor motor direct-drive drilling or milling machine according to claim 1, wherein the mechanical transmission box and the electrical control box are two independent parts, a box portion of the electrical control box is made of insulating materials, and all live components are assembled in the insulating box portion; two groups of wires enter the mechanical control box, which are motor drive and signal acquisition line groups and displacement sensor power and signal line group.

* * * * *